United States Patent
Drummond et al.

(10) Patent No.: US 7,037,393 B2
(45) Date of Patent: May 2, 2006

(54) METHOD OF CONSTRUCTING A DESICCANT CONTAINER

(76) Inventors: Desmond Charles Drummond, Heathside, Kennett Road, Bury St Edmunds, Suffolk IP28 6SS (GB); Andrew Robertson Drummond, Harwood Villa, Wellington Street, Newmarket, Suffolk CB8 OHT (GB)

( * ) Notice: Subject to any disclaimer, the term of this patent is extended or adjusted under 35 U.S.C. 154(b) by 0 days.

(21) Appl. No.: 10/511,953

(22) PCT Filed: Apr. 22, 2003

(86) PCT No.: PCT/GB03/01730

§ 371 (c)(1),
(2), (4) Date: Oct. 21, 2004

(87) PCT Pub. No.: WO03/090902

PCT Pub. Date: Nov. 6, 2003

(65) Prior Publication Data

US 2005/0173044 A1    Aug. 11, 2005

(30) Foreign Application Priority Data

Apr. 26, 2002 (GB) .................................. 0209523
Aug. 12, 2002 (GB) .................................. 0218637

(51) Int. Cl.
*B32B 37/00* (2006.01)
(52) U.S. Cl. ....................................... 156/73.1; 156/69

(58) Field of Classification Search ................ 156/69, 156/73.1, 292, 308.2, 308.4, 309.6, 580.1, 156/580.2; 264/442, 443, 445
See application file for complete search history.

(56) References Cited

U.S. PATENT DOCUMENTS

| | | | |
|---|---|---|---|
| 4,044,941 A | 8/1977 | Knudsen | |
| 4,772,300 A | 9/1988 | Cullen et al. | |
| 5,465,856 A | 11/1995 | Sheffler | |
| 5,522,204 A * | 6/1996 | Wood | 53/452 |
| 5,569,316 A * | 10/1996 | Flaugher et al. | 96/135 |
| 5,716,432 A | 2/1998 | Perrine | |
| 5,942,060 A | 8/1999 | Berger | |
| 6,616,737 B1 * | 9/2003 | Evans et al. | 96/135 |
| 6,623,549 B1 * | 9/2003 | Evans et al. | 96/117.5 |

* cited by examiner

*Primary Examiner*—James Sells
(74) *Attorney, Agent, or Firm*—Kinney & Lange, PA

(57) ABSTRACT

A method of constructing a desiccant pot by trapping a spun-bonded low density membrane between two separate parts constituting either the pot lid or the pot body, these two separate parts being made of high density plastic, and then fusing the membrane and the separate parts together, in which one of the separate parts has upon its touching surface an energy directing protrusion, arranged such that when the three components are assembled so that the two separate body and lid parts are pressed together with the membrane between, the energy directing protrusion extends from one touching surface to the other to space them slightly apart.

11 Claims, 2 Drawing Sheets

METHOD OF CONSTRUCTING A DESICCANT CONTAINER

CROSS-REFERENCE TO RELATED APPLICATION(S)

This application is the national stage of PCT Application No. PCT/GB03/01730 filed Apr. 22, 2003 for "Method of Constructing a Desiccant Container" by Desmond Charles Drummond and Andrew Robertson Drummond, which in turn claims priority from British Application No. 0209523.0 filed Apr. 26, 2002 and British Application No. 0218637.7 filed Aug. 12, 2002.

BACKGROUND OF THE INVENTION

This invention relates to desiccant stoppers for a wide range of containers, and concerns in particular plastic stoppers, comprising a breathable plastic membrane to absorb any free moisture (or odours and the like) in the container.

Desiccant stoppers are used to control the moisture or odour vapour levels of air, within a sealed container, such as a bottle, jar, bag or box, and to control the closed atmosphere to the benefit of sensitive products such as pharmaceuticals packaged within. They are produced in a number of sizes and types relevant to the size and nature of the container and the content to be protected. They must be non-toxic, resistant to water, strong, sterile, and able to provide a microbial barrier. They must also be dust-free, and dust-proof.

The present invention relates to the type of desiccant stopper described in WO 02/038465 which comprise a suitably-sized capsule, rather like a small pot or jar, as the desiccant holder, and after this has been filled with the chosen desiccant it is capped with either a porous-type material wad (such as a thin disc of cardboard) crimped into place, or capped with a moulded plastic lid with cast-in perforations.

Dependent upon their end use, desiccant stoppers can be filled with a wide variety of desiccant-material content. In the event that they are required to control moisture, suitable absorbent materials are silica-gel, or molecular sieve, while for the control of odours, granulated carbon is used. Some devices can be used to control the level of a specific gas within a sealed container where the gas might have an ill effect upon the contents. One such gas is oxygen; oxygenation can often lead to serious content deterioration. In some instances, a mixture of several different materials, and types of material, will be formulated and used, and there are a number of proprietary brands of admixtures on the market.

Regardless of their content, these stoppers are generally referred to as "desiccant stoppers"; their use is extensive within Pharmaceutical, Veterinary, Foodstuffs, and Electronics goods packaging.

WO 02/038465 discloses a method for the production of such a stopper, in which method a fibrous fabric sheet is held in place between the two relevant parts—the stopper body and the lid—and these two are then fused together and to the sheet so that on cooling and solidifying they form a solid, integral plastic supporting frame around the sheet fused thereinto. The term "fused" as used herein means that the materials of the body and lid and the materials of the sheet have become one integral body, as though the entire stopper had been cast in a single piece. Thus, the body and lid materials are not merely attached to either side of the fibrous sheet, and do not even merely extend integrally through the sheet, but are instead actually integral with—have become one with—the sheet.

The fibrous fabric sheet is that spun-bonded breathable plastic (Low Density Polyethylene, or LDPE) material known as TYVEK HBD 1059, and manufactured by Dupont Spun-bonded materials made from LDPE or the like—referred to hereinafter for convenience simply as "spun-bonded plastics"—are immensely strong, and will not tear. They will bond with other plastic parts of similar plastic specification providing temperature profiles are strictly observed (being extremely thin, typically as little as 0.15 mm thick, they are easily performance-impaired, even destroyed, by the application of too much heat).

Spun-bonded plastics, and particularly the TYVEK types of material, are most suitable to act as a permeable membrane for desiccant stoppers due to the superb transfer through them of moisture and odour vapours. The microporosity of the material controls dust emission, and the high tear strength and puncture resistance is perfect for ensuring the integrity of the final finished article. Another example of such a spun-bonded plastics is that material available under the name TEIJIN, and manufactured by Unisel (now amalgamated with Dupont).

The method might be said to be characterised by the manner in which the membrane and body/lid parts are disposed to enable the required sonic fusing to take place. A high density pot/lid plastic can most reliably be fused with a low density membrane plastic provided that the pot/lid make physical contact with each other, to transmit the vibrations and make them melt, with the membrane retained in a recess between the two such that it, too, melts—to become fused integrally with the pot/lid—but only at its very outermost edge.

BRIEF SUMMARY OF THE INVENTION

According to the invention, there is provided a method of constructing a desiccant pot by trapping a spun-bonded low density membrane between two separate parts constituting either the pot lid or the pot body, these two separate parts being made of high density plastic, and then fusing the membrane and the separate parts together, in which one of the separate parts has upon its touching surface an energy directing protrusion, arranged such that when the three components are assembled so that the two separate body and lid parts are pressed together with the membrane between, the energy directing protrusion extends from one touching surface to the other to space them slightly apart.

DETAILED DESCRIPTION

Figure 1A:
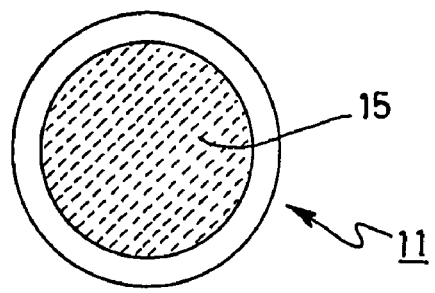
FIGS. 1A & 1B show in plan and in section a desiccant stopper.

Thus in this method of ultrasonic welding, when joining two or more High Density plastic parts, (end cap(s) and body) and a Low Density plastic spun-bonded material membrane, the high density plastic components are profiled, so that at least one of those components has an energy director ridge(s) or point(s) designed into the component.

An energy director profile is a section of the moulding which is situated at the intended point of an interface, when that interface will marry with another separate interfacing component. It is a fine protuberance, either a ridge(s) or point(s) standing higher than the underlying land area from which it protrudes.

Thus the energy directing protrusion may form a continuous ridge around the periphery of one of the parts or could comprise a series of discrete protrusions arranged around the periphery of the part. Preferably the distance the protrusion projects from the touching surface is between 0.5 to 0.7 mm.

When the parts to be welded are placed together and are touching, the height of the energy directing ridge(s) or point(s) separates the two flat interface surface areas, which can only then initially interface across the/those highest points.

The effect of the energy directing protrusion is to do exactly as the term implies, to direct high intensity friction to an exact position, designed as a sharp edge(s), or a sharp point(s). Preferably the point or edge is designed to be as sharp as possible—with the cross-sectional area of the tip of the protrusion being minimised.

Because that sharp edge(s) or sharp point(s) is the first touching point of interface with the other component to which it is to be joined, and whilst it is subjected to a holding pressure, the force applied to hold the components together is concentrated at that point(s), in consequence, all of the energy released at the moment of ultrasonic vibration is also directed to that point(s).

The vibratory action applied, causes intense frictional heat at those first interfacing points. This spreads deeply into secondary interface areas now brought together by the collapse and dispersal of the energy director profile(s). The areas of contact become molten and fuse together. The result is a strong weld.

The stopper is pot-like—that is, it is in the shape of a small container (perhaps 0.6 in [15 mm] across, and 0.8 in [20 mm] deep) for holding in use the desiccant (or other) material contained by the stopper. The stopper can be of any convenient cross-section, but a tubular section is generally most suitable, fitting into most containers of pills or the like.

In the case of this application, the energy director is a sharp knife like edge, at the end(s) of the tubular body component.

By moulding a chamfer to the outside edge of the tube wall, a knife like edge around the entire periphery of the end(s) of the capsule body is formed to produce a suitable energy director. In this case it is preferred that the angle of chamfer is of the order of 60°.

Preferably the energy directing protrusion is arranged such that it bears against a peripheral area of the membrane.

The stopper ends up as a one-piece (integral) object, but for manufacturing purposes it is formed from at least three pieces, namely a body portion, a lid (or cap) portion that fits into the body portion, and a membrane portion that is placed between and fuses to the body and lid portions. The lid (or cap) portion is conveniently a simple one-piece object that fits into the body portion, the membrane portion being between and fused to the body and lid portions.

Of course, although the body portion may be formed with its other, non-lid end, already closed, it is also possible to have the body portion as an open-ended central ring portion, with a cap/lid at each end.

The flat bottom surface of the body portion, and the flat top surface of the (or each) lid/cap portion, provide the two end faces of the stopper; one or both of these is made from the fibrous fabric sheet of plastics material fused sealingly around its periphery to the main/side parts—the wall portions—of the body or lid appropriately.

For the stopper a typical preferred material is a High density Polyethylene (HDPE), and examples of this are that material known as LADENE (an HDPE manufactured by SABIC Marketing Ltd. Saudi Arabia and distributed in the UK by ALBI Ltd., of Knutsford. Cheshire), and the material sold by BP Chemicals as "BP High Density Polyethylene" (and distributed in the UK by Distropol Ltd., of Chertsey. Surrey). Each of these grades of HDPE are FDA approved, and are also suitable for near field and far field ultrasonic welding.

Alternatively high melt polypropylenes can be used.

For the membrane the preferred material is, as intimated above, that known as Perfecseal HBD 1059B TYVEK, manufactured by Dupont. This is a low density polyethylene. Dupont produce a range of materials under the Trademark TYVEK, each of which have specific end uses. Many of the products from this range are suitable for the purposes which are here described. Another suitable material is that available under the name TEIJIN, and manufactured by Unisel. The principal purposes of these types of materials are as breathable fabric membranes used to construct bags or sachets, or to cover plastic or foil tray-like containers, to which they are fastened using conventional heat sealing techniques. For best results a large area of contact is required between the two materials which are to be joined.

At the time of assembly of the components, and when they are correctly positioned, each to each other, the positions are as described:

a) The Tyvek membrane is placed into the end cap, where it is retained being an interference fit.
b) The capsule body is then placed into the open end of the end cap(s) and pressed into place.
c) The assembled components are then as a sandwich with the Low Density plastic spun-bonded membrane trapped firmly between the two High Density plastic components, (Being the end cap(s) and the body of the capsule.) The energy director profile is in direct contact with the spun-bonded membrane material, and is held in position under pressure.

At the time the ultrasonic welding process is applied, the parts are forced together by the actuator, which applies a holding pressure before the ultrasonic vibratory welding period begins.

The sharp knife-like edge of the High Density tubular body of the capsule, is forced against the Low Density spun-bonded membrane, situated and supported in the High Density end cap(s). The Low Density spun-bonded membrane, typically only 0.15 mm thick, compresses at the area of the point of contact with the High Density energy director profile, closing the porous nature of the membrane material, substantially increasing its density at that point. When the ultrasonic vibrations are applied, the energy director leading edges are the first points of interface to be agitated, and are subsequently the first areas of interface to melt and fuse together.

The friction induced melt, progresses through the extremely thin, (lower temperature affected) spun-bonded material, to the high density plastic (higher melt temperature) component on the other side of the membrane, spreads and fuses, becoming an integrated mass, which when cooled forms a strong weld, fusing the end cap(s), membrane and capsule body, into a solid single part.

This method relies upon the technique of sonic—that is to say, "ultrasonic"—welding of thermoplastic parts to fuse the body and lid parts together, embedding the membrane therewithin. This technique is now described in more detail.

The principle of ultrasonic assembly involves the use of high-frequency mechanical vibrations transmitted through thermoplastic parts to generate a frictional heat build-up at an interface. The effect of the vibrations causes intense friction between separate but touching parts, causing the materials to heat and melt and weld/fuse together.

This vibrational movement is effected by a vibrating component called a "sonotrode", which is applied at right angles to the surface of a part to be welded. The latter starts to vibrate throughout due to a series of stationary waves, with a maximum amplitude in the area of contact of the two parts to be joined. Ultrasonic plastic welding techniques, have been successfully used for more than 25 years by engineering companies within the plastics industry.

After cooling, which is rapid, a solid homogeneous weld results between the parts of the assembly. The membrane is thus integral with the solid plastic of the body and lid parts, and so is inseparable therefrom. It thus provides an impermeable barrier to the passage of microparticulate matter, preventing escape of the chemical ingredients of the capsule, and so making the stopper unit both dust-free and dust-proof. The membrane is presented as a window to the stopper, allowing unimpeded passage of moisture or odour vapours, in either direction, through the microporous material.

One important factor relevant to the use of sonic welding for this purpose is the compatibility of the body/lid material and the membrane material. The preferred choice for the spun-bonded plastics membrane material is TYVEK, which is a Low Density Polyethylene (LDPE) product. It might then be thought that a low density material, and specifically a low density polyethylene, should also be used for the body/lid material. However, it transpires that low density materials such as this are in fact rather difficult to weld sonically. The reason seems to be that they are too "soft", and vibrations generated in one part tend to get damped out too easily, and are not transmitted through to the other part, so that the two do not move against each other in a manner sufficient to produce fraction and heat—and without that heat, of course, they do not melt, and so do not weld/fuse together.

Another crucial factor is temperature. Spun-bonded plastics such as TYVEK are extremely thin, and are prone to the effect of high temperatures which causes them to shrivel. Exposure to temperature in excess of 125° C. renders TYVEK useless, as the matrix which provides the permeability melts, collapses, and congeals into an impermeable structure. The melt point at which HDPE becomes molten, is approximately 150° C.; this temperature is higher than the destruction point temperature of TYVEK, so it might be thought that fusing a low density membrane to a high density stopper body/lid would be impossible. However, while merely fusing a sheet of an LDPE material such as TYVEK to a body of an HDPE material is indeed fraught with problems, these seem to be banished in the case where the low density sheet is trapped around its periphery between two high density surfaces; surprisingly, placing the low density membrane between two high density parts in the form of a sandwich does in fact produce a reliable fusion of the components. Accordingly, the use of the energy directing protrusion reduces this problem of high temperature upon the former, as the melt temperature of the high density parts is contained local to the fusion point of the two, leaving the greater expanse of the low density membrane completely unaffected.

The success of this technique depends entirely on the ability of the materials to propagate vibrations without damping them; excellent results can be obtained with suitable thermoplastic rigid materials with a high modulus of elasticity. The method permits the welding of objects of very complex design with a sonotrode which is very simple in form.

As referred to hereinbefore, the stiffness of the polymer to be welded will influence its ability to transmit the ultrasonic energy to the joint interface. Generally the stiffer a material the better its transmission capability. It is usually not possible to weld materials of different types by ultrasonics, due to the differences in fusion temperature. If the macromolecular structure is not the same for both materials, it will prevent interpenetration.

During the period of time that the ultrasonic vibration welding method is applied, a degree of pressure must be exerted to hold the components together. Each high density component must be in contact with the other in order that the ultrasonic vibrations can be transmitted through the component nearest the sonotrode. Moreover, each component should be designed to provide a sufficient surface area to be in firm contact with an equal surface area on the part to which it is to be welded. The fusion takes place at the interface of the two surfaces. Each component is held together by applied pressure at the point(s) at which they become welded.

As the ultrasonic vibration is applied, and with the simultaneous application of pressure holding the combination together, the ultrasonic vibration passes through one of the high density parts and on into the second, causing friction effects at their interface. The friction produces heat sufficient to melt the plastic—both of the body/lid (the two contacting high density components) and the membrane (the low density component), allowing the plastics to flow, and by the pressure being exerted upon the two parts forcing them together, fuses all three into an inseparable bond. Thus, the membrane is securely fused to the container, being embedded at all of its outer edges, and at any interface with the capsule body and/or the retaining end cap(s). The edges of the membrane and some of the surface membrane material close to the edges is penetrated by the flowing plastic, over moulded and through moulded by the molten plastic whilst liquid and under pressure. The molten plastic of the body end cap(s) fuses to the spun filaments of the fibrous spun-bonded plastics material which is the membrane, and as it cools solidifies and forms a solid plastic frame around and through the membrane. The spun-bonded plastics material itself is also part welded in the operation, as some degree of sonic vibration is effective between the low density membrane and the high density capsule body; this further enhances the fusion bond between the body and lid high density components.

The following points should be borne in mind when using sonic welding.

1. The cap/lid is to be welded to the body, and while this could be a butt weld it is preferred to chamfer each abutting face in a matching manner, to form a larger weld surface. Specifically, the edge of the side wall of the cap(s) is moulded to a form recommended as a correct interface profile for ultrasonic welding.
2. The edge of the side wall of the body is correspondingly moulded to a form recommended as a correct interface profile for ultrasonic welding, but also incorporates a section which, when the two plastic components (body & cap) are placed together with the TYVEK type material also in place, acts as a snap fit to temporarily secure the components together, with the underside of the cap in close proximity with the uppermost side of the top edge of the inserted profiled wall of the plastic body.
3. When a membrane window is required at both ends of the stopper, the process described is repeated at the opposite end of the container, which is moulded to suit.
4. It is normally most convenient to assemble the stopper one end at a time, in an upright position, with the end cap placed on top at the time of assembly and ultrasonic welding.
5. Once correctly positioned, with the membrane held therebetween, the body/lid mouldings are ultrasonically welded together to form an integrally-joined capsule. The or each porous membrane is encapsulated within the previously separate components, held in place by the weld between the body and the relevant cap or end.

In this way the fabric sheet—the spun-bonded plastics TYVEK-type material—is fused around its periphery to the material forming the stopper body/lid combination. The membrane is thus presented as a window to the stopper container's body or lid portion, and thus in use allows unimpeded ingress by moisture or odour vapours. Moreover, reinforced as it is by the plastic frame in which it is totally suspended, the membrane acts as a structural form securing the contents of the stopper from loss or damage.

As can be inferred from what has been said above, there is a choice of spun-bonded plastics material membrane at one or more positions on the desiccant stopper. Typically the position of a single membrane could be at the end of a stopper, whilst a stopper with two membranes could have them situated one at either end (the purpose of two membranes would be to allow a faster ingress of vapours).

And as also noted above, in the case of a stopper with one membrane only, it will be seen that there is a requirement for two parts. One is the body portion—the receptacle into which the desiccant is placed, while the other is the lid portion. Either may carry the membrane as its end wall, but usually it is more convenient to use the lid for this.

When two membranes are required within a single desiccant stopper the unit can be constructed in a variety of ways. One preferred way is to manufacture the unit in three or more parts, comprising two separate cap/lid-like end parts and one (or more) central body part open at both ends. The end parts—each identical in manufacture—carry the membrane as a tight fit, and each is welded separately to the central body part to form the complete container (into which the fill content is placed before attachment of the second "lid" end to complete the structure).

One further advantage of the described method of assembly is the ability to pre-prepare the components ready for use. The spun-bonded plastics membrane discs can be pre-cut and inserted into the cap ends where they are held fast being an interference fit, before being fitted to the container body. Similarly the body of the capsule can be pre-assembled to one cap end with the spun-bonded plastics membrane already inserted, and sonic welded together, as a pre-form produced for the filling machinery.

Where the several parts of the stopper—the body and one or more end cap/lid—are manufactured separately (and then joined together) it is of course possible to give them different colours. This may be used, if wished, for identification purposes—to indicate, perhaps, either what is inside the stopper (what desiccant is used) or what the stopper is to be employed with (what materials or articles it can be utilised to keep dry, say).

The area of membrane left exposed as a window of permeable material to the container, is not affected in any detrimental way, and its efficacy is not impaired. The design allows ingress or egress of gaseous vapours through the membrane, to or from the encapsulated chemical materials contained within the capsule, but prevents leakage of the contents, due to the high integrity and reliability of the seal, caused by the fusion of each of the components to become one integral part.

Ultrasonic Welding

The Process

The process of ultrasonic welding as here applied utilises the ability of thermoplastic resin to form a welded joint at the interface of two parts when, by generating heat at the interface by applying directed mechanical vibratory energy, the plastic melts, and becomes fluid. Once the resin is molten at the joint, it flows at the point(s) of contact, and if a force is applied during the time of the heat generation the parts are pressed and fused together to form an inseparable homogeneous link. This technique is fast, efficient, non-contaminating, and does not require consumables.

Ultrasonic assembly systems are available in several levels of frequency, and can be controlled in terms of time, energy, energy compensation, distance and force applied. Suitable frequencies for a system capable of the type of assembly required in this invention are around 20 kHz, rated at between 1100 and 3300 Watts.

The Equipment

Branson Applied Technologies Group, of Hayes, Middlesex manufacture a wide range of ultrasonic vibratory welding machines. Ultrasonic Engineering Ltd, of Singapore Road, London manufacture a specialist range of ultrasonic vibratory welding machines.

A typical ultrasonic vibratory welding system consists of four essential components.

1) The power supply—electronically converts the 50 Hz mains supply to the required 20 kHz operating frequency.
2) The converter—also driven from the power supply—consists of a number of polarised piezoelectric discs which have a natural resonance to 20 kHz. When subjected to the ultrasonic frequency output from the power supply, the discs increase, and then decrease their physical size, in the same time frequency as the power supply, in other words at a speed correspondent to 20 kHz. In this way vibrations are caused by the electrical signal being converted into mechanical energy, and they are passed directly to the horn/(sonotrode), which is then brought into contact with the work piece for a determined time and set pressure, to produce intense friction and a subsequent weld in a very efficient and controlled way.
3) Acoustic tooling—used to couple, and boost energy from the converter to the parts to be welded. The tooling is manufactured from either titanium or aluminium alloy and is tuned to resonate at the same frequency as the converter. The amplitude, or vibration movements, from the converter alone is often insufficient to generate a weld, so acoustic tooling, or horns/(sonotrodes) as they are called, are installed to amplify the amplitude to a corrected value. In order to obtain the correct resonant frequency, and a magnification of amplitude to the correct level, to provide and transfer uniform movement to the working face of the horn/(sonotrode), great care is necessary to determine the correct design of shape and mass of the tooling, and the material from which it is manufactured.

Acoustic tooling is made from two parts: a booster horn which modifies the amplitude from the converter to the correct value for the specific application; and the work horn/(sonotrode) designed for the job. The work horn/(sonotrode) is configured to suit the geometry of the parts to be welded.

The ideal situation is to provide a flat face for the work horn/(sonotrode) to channel energy into the parts.

Operating the Method

Vibratory energy under pressure is passed into the work piece by the acoustic tool or horn which is brought into contact with one of the parts to be welded. Vibratory energy is passed through the work pieces resulting in localised frictional heating at the joint interface surfaces, causing the plastic to melt. On termination of the energy input, the plastic solidifies forming a high strength molecular bond. The weld is achieved in a time of typically less than one second, the heat generated is local to the joint area.

4) The actuator—a simple, pneumatically controlled device which brings the acoustic tooling into contact with the work piece. It must be of rigid construction, able to consistently present the welding horn/(sonotrode) accurately onto the work piece, and maintain a set pressure for the duration of the weld time.

Usually it is mounted on an compressed air driven cylinder, which has controlled movement up and down, or through other single axis directions.

Efficiency

Two factors which establish a thermoplastic resin's ability to weld, are how well it transmits energy from the welding horn to the joint interface, and how good is its coefficient of friction and melt temperature.

For ultrasonic welding purposes, resins are divided into two major groups, Amorphous or Crystalline. These groupings refer to the molecular structure of the plastic. In the solid state, amorphous plastics have no ordered structure. This enhances the materials ability to transmit energy.

Amorphous materials do not have a precise melt point. With heat they become soft before they then become a viscous liquid. This progressive melt to molten state aids the welding process by allowing at the point of interface, fusion of the liquid plastic. The process is easy to control.

Far and Near Field Welding

Clearly distance to the joint line from the horn land area is a critical consideration. To assist with defining a resin's ability to transmit ultrasonics the terms "near field" and "far field" have been adopted for defining distance of energy transmission. These terms are generally applicable to 20 kHz operation.

Near field welding is defined as the distance between horn/(sonotrode) and joint interface if less than 6 mm. Reasonable energy transmission in rigid amorphous materials can be obtained over this distance.

Far field welding is defined as the distance between horn/(sonotrode) and joint interface when greater than 6 mm.

Other Factors

Two other factors of consideration are component rigidity and the energy route to the joint or interface.

The actuator will apply a pressure of between 20 and 80 Newtons to the parts to be welded at the time of the welding process. The assembly must be designed to withstand such pressure during the operation. The application of a set measure of pressure is important to the mechanical action of the Horn/(sonotrode) at the time that it is in contact with the plastic component(s), and it must be progressive, as the plastic material when molten partially compresses whilst under pressure from the actuator.

Good component design is crucial for successful welding. In order for the process to work, energy has to be transmitted through the components one to the other to promote a good weld, the strength of which is determined by the depth of penetration. A weld depth of 0.5–1.0 mm is considered sufficiently strong for the application described.

To ensure good repeatability of weld, the settings of the equipment should be observed and committed to record. Ultrasonic equipment can be integrated into automated systems. Any information relevant to weld parameters, such as time, amplitude, frequency, energy, or distances, if available digitally from the welder equipment, can be extracted, recorded, and stored in a database.

A desiccant stopper, in accordance with the invention, will now be described, though by way of illustration only, with reference to the accompanying diagrammatic Drawings (the Drawings are based on cylindrical and circular designs, but other shapes are also suitable for moulding).

FIGS. 1A & B are almost self-explanatory. They show a desiccant stopper (generally 11) of the invention. The stopper is tubular, and of circular section, and thus is like a small pot.

Figure 1B:
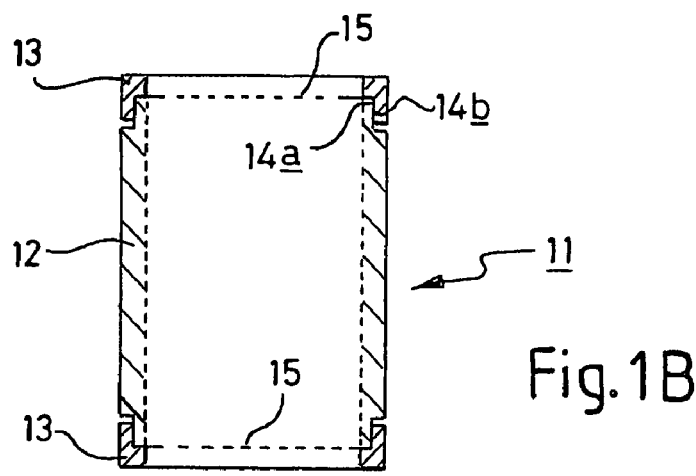

The version of stopper shown here has a tubular main body portion (12) and two annular lid portions (13), one at each end. Each lid 13 fits on to the body using mating recesses (14a in the lid, 14b in the body, as shown). The top (as viewed) surface of the lid 13 is a "window" (15) made of a porous fibrous fabric sheet material membrane; this is shown in FIG. 1B with diagrammatic perforations, to indicate that it is a porous sheet, but in fact it has no visible perforations at all. All around its edge (16) the sheet is trapped between, and integrally fused to, the lid and the body.

Figure 3:
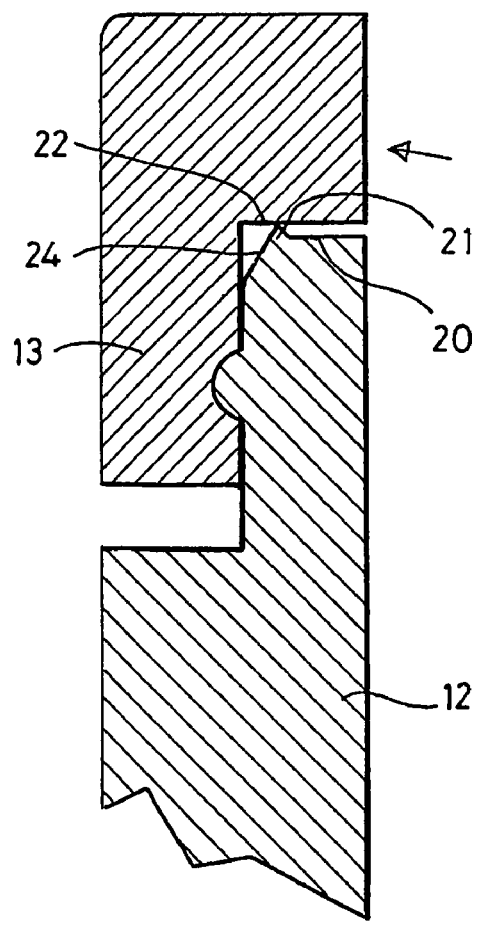
FIG. 3 is an enlarged part section of the desiccant stopper with the membrane omitted for clarity.
Figure 4:
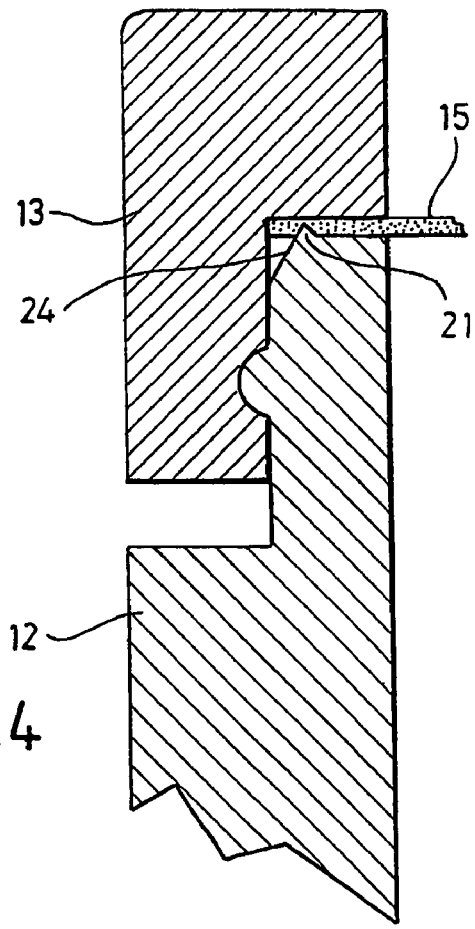
FIG. 4 is an enlarged part section of the desiccant stopper illustrating the membrane in place.

In the embodiment of FIG. 1 the membrane 15 is located between the body 12 and the lid 13. This area is shown only generally in FIGS. 1 and 2 with the specific form shown in detail in FIGS. 3 and 4.

Figure 2A:
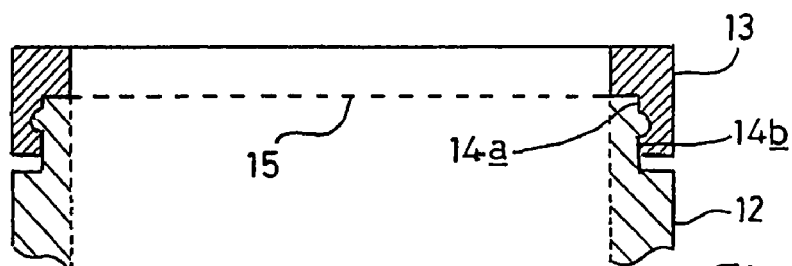
FIGS. 2A & 2B show in section both final and exploded part views of the stopper.
Figure 2B:
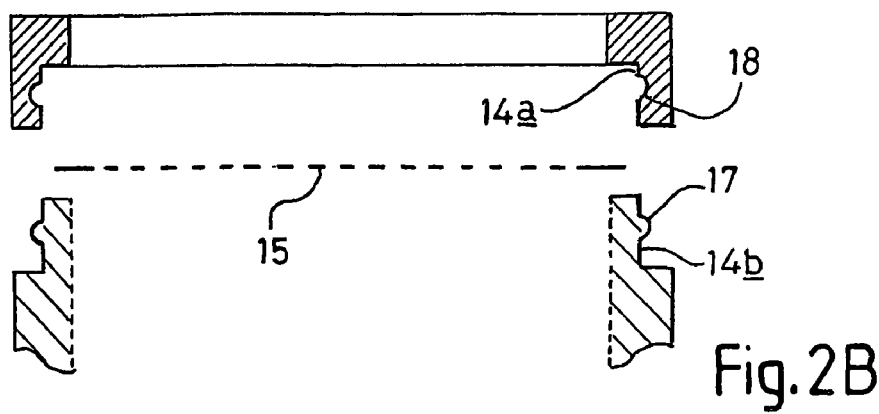

FIG. 2 illustrates generally the steps in manufacture and depicts the snap fitting 17/18 between the mating body 12 and lid 13.

Both the pot lid 13 and a pot body 12 are of high density plastic. A spun-bonded low density membrane 15 is trapped between the lid 13 and body 12. After trapping the membrane 15 in position the membrane 15 and the separate parts 12, 13 are fused together One of the separate parts 12, 13 (in this case the pot body 12) has upon its touching surface 20 an energy directing protrusion 21, arranged such that when the three components are assembled so that the two separate body and lid parts are pressed together with the membrane between, the energy directing protrusion 21 extends from one touching surface 20 to the other 22 to space them slightly apart.

The protrusion 21 comprises a circular ridge with a sharp edge formed by a 60° chamfer 24 on the outside edge of the wall of the pot body 12 around the periphery. The pot ridge 21 extends between 0.5 and 0.7 mm from the touching surface 20.

At the time of assembly of the components, and when they are correctly positioned, each to each other, the positions are as described:

a) The Tyvek membrane 15 is placed into the end cap 13, where it is retained being an interference fit.
b) The capsule body 12 is then placed into the open end of the end cap(s) 13 and pressed into place.
c) The assembled components are then as a sandwich with the Low Density plastic spun-bonded membrane 15 trapped firmly between the two High Density plastic components, (Being the end cap(s) and the body of the capsule.) The energy director profile 21 is in direct contact with the spun-bonded membrane material 15, and is held in position under pressure.

At the time the ultrasonic welding process is applied, the parts are forced together by the actuator, which applies a holding pressure before the ultrasonic vibratory welding period begins.

The sharp knife-like edge 21 of the High Density tubular body 12 of the capsule, is forced against the Low Density spun-bonded membrane 15, situated and supported in the High Density end cap(s) 13. The Low Density spun-bonded membrane 15, typically only 0.15 mm thick, compresses at the area of the point of contact with the High Density energy director profile 21, closing the porous nature of the membrane material, substantially increasing its density at that point. When the ultrasonic vibrations are applied, the energy director leading edges are the first points of interface to be agitated, and are subsequently the first areas of interface to melt and fuse together.

The friction induced melt, progresses through the extremely thin, (lower temperature affected) spun-bonded material, to the high density plastic (higher melt temperature) component on the other side of the membrane, spreads and fuses, becoming an integrated mass, which when cooled forms a strong weld, fusing the end cap(s), membrane and capsule body, into a solid single part.

The assembly process of the desiccant pot is divided into six stages. For the purpose of explanation, each stage is described as a single action, but in production, the action will be constantly repeated. It is implied that at the completion of each single action, at all stages, the process is repeated by command of an electronic instruction. All stages are simultaneously active, synchronised to repeat at the same time.

Stage 1) Plastic Injection Moulding of the Plastic Component Parts

The body of the capsule, and the end cap(s) are produced using modern injection moulding techniques, from High Density Polyethylene with a melt index of 30.

Multi cavity moulds are employed to produce high quality mouldings of each of the components required, from moulds incorporating hot runner systems. This method has the effect of producing cosmetically pleasing mouldings, to satisfactory dimensional tolerances, with very little scrap or reject rate, due to the absence of sprue and runner.

Use of a high melt material assists in the moulding cycle time, particularly in the manufacture of thin wall, or fine detail items. The mouldings can be produced to colour of choice.

It is known that High Density Polyethylene materials which have a high melt index figure are also likely to be stiffer after moulding than lower melt index materials made from the same material. The effect of the stiffness factor in the finished components assists the ultrasonic welding processes that follow. High Density plastic materials respond well to ultrasonic welding processes, but weld performance is enhanced when the stiffness of the plastic material contributes to an improved flow path for the sonic vibrations to the component(s) interface, which is the required point of fusion/weld.

Both that material known as LADENE and the material sold by BP Chemicals as "BP High Density Polyethylene" are satisfactory.

Stage 2) Preparing the Spun-Bonded Breathable LDPE Membrane

The spun-bonded breathable LDPE membrane was made from TYVEK HBD 1059.

Tyvek is extremely strong, and is exceedingly difficult to cut repeatedly, without the need to constantly re-sharpen the punch tooling. A better and totally consistent method, is to use Laser cutting techniques which do not rely on sharp edge forms to cut.

Using a laser—typically a Carbon Dioxide Laser—to cut material is in general well known, and needs no detailed comment here. It is, however, well suited to adaptation as a device for marking and cutting plastic materials, and is particularly efficient and economic with thin film-like materials.

A suitable laser cutter is available from Alltec UK Ltd., of Maltby, South Yorkshire, while Laserex/Hi-Tech UK Ltd., of Rotherham, South Yorkshire, manufacture a range of ancillary equipment essential to Laser operation.

Tyvek type material can be procured in reel form, and can be slit to any width required.

Tyvek is very inclined to static interference during handling, and discs pre-cut and stored together, are prone to collect in difficult to separate masses. Precautions are recommended to be taken to prevent the problems that this state causes. The manufacturers recommend a number of solutions to the problem in their literature.

One preferred method of control of the Tyvek discs whilst being cut to size from the reel web, and to avoid the problems of static interference (the discs stick together), is to hold the Tyvek material prior to the time of the Laser cut with a vacuum-operated suction cup, and then to Laser-cut around the suction pad, to the disc size required, the Laser cut to be completed whilst the Tyvek is held firmly in place by the suction pad. The advantage of this method of handling is that first of all, the Tyvek disc is under control as a single item, and is not allowed contact with other discs, so avoiding the static which is caused when discs in multiples are in contact with each other. Secondly, the cut disc, firmly held, can be positioned very precisely into the presented end cap of the capsule, at the following stage of the operation.

Thus: this method of operation is conducted by passing the Tyvek web of material from the primary reel, over the suction cup section of a pick-and-place pneumatically-operated dextrous robot arm, which upon command will move up and under the Tyvek web, and will fasten itself by suction onto the underside of the Tyvek material prior to the Laser cut.

The Laser cutting equipment is then situated over the Tyvek web, and cuts in a downward motion around the vacuum suction cup, which at completion is left holding the separated disc. The robot can now remove the disc from the path of the overhead reel by pulling it downwards, and because of its dextrous capability can then place it into the end cap, at an adjacent point, before returning to repeat the process. The method can be reversed.

After the previous Laser cut, the Primary reel of Tyvek indexes forward on command, to present a new area of uncut web to the suction cup section of the pick and place robot arm, and the expended perforated section of the reel of Tyvek is wound onto a Secondary reel, as scrap. The process then repeats.

It will be recognised that a bank of suction pads can be arranged to accommodate a number of discs to be cut either singly by the computerised Laser beam moving from one location to the next, or by a number of Laser beams working simultaneously.

Stage 3A Emplacing the Membrane in the Lid

The end caps are presented to an adjacent point of access for the robot arm, in an open, end-up position, delivered to that point via a vibratory bowl feeder and collation device, which sorts the components into a continuous stream of right-way-up components ready to receive the Tyvek disc.

The disc is pressed into the end cap, and is retained by an interference fit between the outer edge of the disc and the inner dimension of the outer wall of the end cap which is raised around its circumference for that purpose. The end cap together with the inserted Tyvek membrane is now conveyed to the next stage.

A second stream of end caps, together with inserted Tyvek membrane discs is conveyed to Stage 5 to cap the other end of the capsule body, and so form the finished product. The caps in this second stream of end caps are inverted on route to enable presentation to the capsule by the robot arm in the correct attitude. The Tyvek membrane is retained in place, being an interference fit.

Stage 3) First Assembly of Plastic Components

The end cap is now part assembled with the inserted Tyvek membrane disc, and is in the correct attitude of open end/right way up.

Tubular bodies, identical at each end, are delivered in a continuous stream from a vibratory bowl feeder and collation device, and they are presented to an adjacent point of access for the dextrous robot arm, to pick and place.

Each tubular body is picked up by the robot arm, and is placed precisely into the open side of the end cap, where it is pressed into place, held in that position by the snap fit design, trapping the Tyvek membrane therein firmly between the (bottom) end cap and the tubular body.

The part-assembled capsule, with the bottom Tyvek membrane held firmly in place by the snap-on bottom end cap, is now conveyed to the next stage.

Stage 4) Filling the Capsule

At this stage, capsules are correctly positioned for the filling process, being in an upright position with the open end at the top.

The empty capsules are passed beneath a volumetric portion filling head, and the correct amount and type of content is discharged from the filling head into the capsule.

The filled part-assembled capsule is now conveyed to the next stage.

Stage 5) Second Assembly of Plastic Components

The "other end" caps complete with inserted Tyvek membrane disc are presented to an adjacent point of access for the dextrous robot arm, in an inverted ready to pick position, delivered to that point by conveyor from the stage 2 operation. The Tyvek is retained by an interference fit.

The inverted cap end is picked up by the robot arm, and is placed precisely onto the open top of the filled capsule body, where it is pressed into place, held in that position by the snap fit design, trapping the Tyvek membrane therein firmly between the cap and the tubular body.

The completely assembled capsule is now prepared for ultrasonic welding.

Stage 6) Ultrasonic Welding the Desiccant Stopper Together

The completely assembled capsule is presented to a position directly beneath the Actuator. The Actuator is set for distance of downward travel, and also set for the degree of force to be applied during the ultrasonic vibration period. It is also set for the length of time of contact with the work-piece.

The Converter is set for the degree of required Amplitude and the length of time of energising the Horn/(sonotrode).

The welding process is commenced with an electronic command from the controller; the duration of the entire operation is less than two seconds.

It will be understood that more than one capsule can be welded at a time. Dependent upon the type of ultrasonic vibratory equipment employed, and the physical size of the components, more than one weld can be executed on the same work-piece at the same time by tuning the Converter and the Acoustic Tooling to accommodate both near field and far field distances of energy transmission. Success is conditional on component design, size, and the suitability of the materials being used.

The invention claimed is:

1. A method of constructing a desiccant pot by trapping a low density membrane of spun bonded plastics between opposed touching surfaces of two separate parts constituting the pot lid and the pot body, these two separate parts being made of high density plastic, and then fusing the membrane and the separate parts together by ultrasonic welding, wherein one of the separate parts is provided with a fine protuberance in the form of one or more ridges or points extending from its touching surface towards the touching surface of the other separate part to space the touching surfaces slightly apart, and pressing the two parts together with the membrane trapped between the touching surfaces so that the membrane is compressed at the point of contact with the protuberance thereby increasing its density at the point such that, at the time of ultrasonic welding, the protuberance acts as an energy directing protrusion, and the ultrasonic vibrations pass from the protuberance on the one part through the membrane at the point where it is compressed to increase its density to the other part.

2. A method according to claim 1, in which, the energy directing protrusion forms a continuous ridge around the periphery said part.

3. A method according to claim 1, in which, the energy directing protrusion comprises a series of discrete protrusions arranged around the periphery of said one part.

4. A method according to claim 1, in which the energy directing protrusion projects from the touching surface a distance of between 0.5 and 0.7 mm.

5. A method according to claim 1, in which the point or edge of the energy directing protrusion is as sharp as possible to minimise the cross-sectional area of the tip of the protrusion.

6. A method according to claim 5, in which the body is a tubular component and the energy directing protrusion is a sharp knife like edge at the end of the tubular body component.

7. A method according to claim 6, in which the energy directing protrusion is formed by moulding a chamfer to the outside edge of the tube wall.

8. A method according to claim 7, in which the angle of chamfer is of the order of 60°.

9. A method according to claim 1, in which the energy directing protrusion is arranged such that it bears against a peripheral area of the membrane.

10. A method according to claim 1, in which the separate parts of the pot body and pot lid are of a high density polyethylene.

11. A method according to claim 1, in which the pot body has first and second ends and each end is provided with a pot lid and a membrane trapped between the pot lid and the adjacent end of the body.

* * * * *